(12) United States Patent
Narusawa et al.

(10) Patent No.: US 7,681,976 B2
(45) Date of Patent: Mar. 23, 2010

(54) PRINTER AND PRINT-CONDITION SETTING METHOD FOR THE SAME

(75) Inventors: Hideyuki Narusawa, Nagano (JP); Yoichi Tanaka, Nagano (JP); Hidetake Nishizawa, Nagano (JP); Katsumi Komagamine, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1316 days.

(21) Appl. No.: 11/151,434

(22) Filed: Jun. 14, 2005

(65) Prior Publication Data

US 2005/0231749 A1  Oct. 20, 2005

Related U.S. Application Data

(63) Continuation of application No. 10/263,346, filed on Oct. 3, 2002, now Pat. No. 6,948,792.

(30) Foreign Application Priority Data

Oct. 3, 2001 (JP) .................. P. 2001-307947
Jul. 24, 2002 (JP) .................. P. 2002-215831

(51) Int. Cl.
*B41J 29/393* (2006.01)
*G06F 15/00* (2006.01)
(52) U.S. Cl. ............... 347/19; 347/5; 347/3; 358/1.16; 358/1.13
(58) Field of Classification Search ............ 347/2–3, 347/5, 9; 358/1.16
See application file for complete search history.

(56) References Cited

U.S. PATENT DOCUMENTS 5,970,220 A  10/1999 Bolash et al.

| | | | |
|---|---|---|---|
| 6,257,693 B1 | 7/2001 | Miller et al. | |
| 6,273,535 B1 | 8/2001 | Inoue et al. | |
| 6,305,775 B1 | 10/2001 | Ohtsuka et al. | |
| 6,417,931 B2 | 7/2002 | Mori et al. | |
| 6,948,792 B2 * | 9/2005 | Narusawa et al. | ............. 347/19 |
| 2001/0024291 A1 | 9/2001 | Mori et al. | |
| 2002/0054350 A1 * | 5/2002 | Kakigi et al. | ............. 358/1.16 |
| 2003/0231341 A1 | 12/2003 | Aichi et al. | |

FOREIGN PATENT DOCUMENTS

| | | |
|---|---|---|
| EP | 0859326 A2 | 8/1998 |
| EP | 1081637 A2 | 3/2001 |
| JP | 06-274294 A | 9/1994 |
| JP | 11-099724 A | 4/1999 |
| JP | 11-219440 | 8/1999 |
| JP | 2000-134458 A | 5/2000 |
| JP | 2000-244724 A | 9/2000 |
| JP | 2000-293446 A | 10/2000 |
| JP | 2001113777 | 4/2001 |

* cited by examiner

*Primary Examiner*—Lam S Nguyen
(74) *Attorney, Agent, or Firm*—Sughrue Mion, PLLC

(57) ABSTRACT

An interface, to which a recording medium storing at least one first setting information item is removably attached to a printer. A storage stores hardware specification data. A reader reads out the at least one first setting information item from the recording medium attached to the interface. A register judges whether the at least one read out first setting information item matches with the hardware specification data, and registers the first setting information item which matches with the hardware specification data as at least one second setting information item. A selector selects one of the at least one second setting information item as a print condition.

8 Claims, 11 Drawing Sheets

FIG.3

```
ROOT ─┬─ TEST001.JPG  ⎫
      ├─ TEST002.JPG  ⎬ IMAGE DATA
      ├─ TEST003.JPG  ⎪
      │      ⋮        ⎭
      │
      ├─ B4TATE.USD   ⎫
      ├─ B4YOKO.USD   ⎪
      ├─ A4TATE.USD   ⎪
      ├─ A4YOKO.USD   ⎬ PRINT-CONDITION
      ├─ B5TATE.USD   ⎪ SETTING FILE
      ├─ B5YOKO.USD   ⎪
      ├─ HAGAKI.USD   ⎭
             ⋮
```

FIG.4

01 : [HEADER]
02 : HeRevision=02.10
03 : HDAuthor="SEIKO EPSON Corporation"
04 : HdCopyright="SEIKO EPSON Corporation"
05 : HdCopyFrag=Possible
06 : HdChangeFrag=Possible
07 : HdKeyWord=" "
08 : HdTitle=" "
09 : HdComment=" "
10 : HdDirection=Vertical
11 : HdCapacity=12580
12 : HdThumbnail=".¥001¥THUMB. USF"
13 : HdPhysicalPaperSize=3.5×5
14 : HdManginess=42, 198, 42, 42

15 : [PAGE]
16 : DrawPicture(" ", 1, 0, 0, 1176, 1560, 0, 2, 4)

PRINTER AND PRINT-CONDITION SETTING METHOD FOR THE SAME

This is a Continuation of application Ser. No. 10/263,346 filed Oct. 3, 2002, issued as U.S. Pat. No. 6,948,792; the disclosure of which is incorporated herein by reference.

BACKGROUND OF THE INVENTION

The present invention relates to a printer and a print-condition setting method for the printer, and more particularly to a printer capable of performing printing with an external memory medium such as a memory card attached to the printer according to print-condition setting information read from the external memory medium, and to a print-condition setting method for the printer.

Further, the present invention relates to a printer capable of performing printing according to print-condition setting information set by peripheral equipment such as a digital still camera (hereinafter called the "digital camera") to be connected via a communication interface and to a print-condition setting method for the printer.

Stand-alone printers (sometimes called direct printers) capable of printing data on printing paper independently have come into wide used recently without the necessity of their being connected to host computers represented by personal computers.

Typically, such a stand-alone printer reads data on printing objects from a memory card added to a card interface and prints out the data. Therefore, any user not owning a personal computer or the like can utilize the stand-alone printer for directly printing the pictorial data taken in by a digital camera and stored in a memory card without a personal computer.

There is also a stand-alone printer for directly reading pictorial data from a digital camera so as to print the data after being connected to the digital camera via a communication interface such as a USB without attaching a memory card to the printer.

Since the stand-alone printer need not be connected to the host computer, the printer body is provided with a control panel (user interface) for setting print instructions and various print conditions that have heretofore been set to specify, for example, types and sizes of printing paper, the number of printing copies, print quality, layouts and so forth over the host computer.

Although the stand-alone printer above is designed so that various print conditions can be set by a user through the control panel, it has been only possible to set the print conditions within a range of contents that have been incorporated into a control device in the printer body. With respect to setting layouts, for example, only the layouts considered to be in general use including printing post cards, seals and indexes, have been defined and performing printing in accordance with a layout for specific use could not have been done.

Consequently, there has been proposed a stand-alone printer so arranged that a print-condition file designating a layout for specific use is stored in a memory card beforehand whereby to read the print-condition file from the memory card in order to set the print conditions when printing is done in accordance with the layout without being incorporated into the control device of the printer body beforehand.

However, the control panel of the stand-alone printer is provided with only necessary and sufficient functions to achieve the original display/selection objective of setting various print conditions but still has a problem in that it is not user-friendly when a desired print-condition file is selected from the memory card with a plurality of print-condition files stored therein so as to set the desired print conditions. Moreover, a highly functional control panel is difficult to provide in view of keeping the production cost lower.

SUMMARY OF THE INVENTION

It is therefore an object of the invention to provide a method of readily selecting a desired print-condition file from a memory card with a plurality of print-condition files stored therein and a printer having a user interface arrangement for effecting the method.

It is also an object of the invention to propose a method of readily selecting a desired print-condition file by using peripheral equipment connected via a communication interface and a printer for effecting the method.

In order to achieve the above objects, according to the present invention, there is provided a printer, comprising:

an interface, to which a recording medium storing at least one first setting information item is removably attached;

a storage, which stores hardware specification data;

a reader, which reads out the at least one first setting information item from the recording medium attached to the interface;

a register, which judges whether the at least one read out first setting information item matches with the hardware specification data, and registers the first setting information item which matches with the hardware specification data as at least one second setting information item; and a selector, which selects one of the at least one second setting information item as a print condition.

In this configuration, when the relevant script is read in from an external storage medium (e.g., memory card) stored with scripts (setting information item) for setting a plurality of print conditions, the scripts designating print parameters (e.g., paper size) supported by the printer are registered in an internal memory. Only the script conforming to the print parameters set in a user interface is indicated.

Accordingly, a desired print-condition script can readily be selected from the memory card stored with a plurality of print-condition scripts in the user interface of the printer.

Preferably, the storage stores at least one third setting information item in advance. The selector selects the print condition from the third setting information item when no second setting information item is registered.

Preferably, each of the first setting information item includes a first value indicating a size of a print medium on which printing is performed. The hardware specification data includes at least one second value indicating a size of a print medium on which the printer can perform printing. The register registers the first setting information item as the second setting information item when the first value matches with the second value.

Preferably, the selector selects the print condition upon receipt of an instruction from a user, and displays the selected print condition to the user.

Here, it is preferable that the print condition includes a size of a print medium on which printing is performed.

Preferably, the register assigns an identifier to each of the at least one second setting information item. The selector sequentially displays the identifier upon receipt of an instruction from a user.

According to the present invention, there is also provided a method of setting a print condition of a printer provided with an interface to which a recording medium is removably attached, comprising the steps of:

reading out at least one first setting information item stored in the attached recording medium;

judging whether the at least one first setting information item matches with hardware specification data stored in the printer, registering the at least one first setting information item which matches with the hardware specification data as at least one second setting information item; and selecting one of the at least one second setting information item as the print condition.

According to the present invention, there is also provided a printer, to which a peripheral device provided with a recording medium which stores at least one first setting information item is connected via an interface, the printer comprising:

a storage, which stores hardware specification data;

a transmitter, which transmits the hardware specification data to the peripheral device via the interface; and a receiver, which receives print job data including a print condition which has been selected in the peripheral device, via the interface.

According to the present invention, there is also provided a method of printing performed in a printer, to which a peripheral device provided with a recording medium which stores at least one first setting information item is connected via an interface, the method comprising the steps of:

storing hardware specification data in the printer;

transmitting the hardware specification data to the peripheral device via the interface; and selecting one of the at least one first setting information item as a print condition, based on the transmitted hardware specification data;

transmitting print job data including the print condition to the printer via the interface; and performing printing at the printer based on the transmitted print job data.

According to the present invention, there is also provided a print system, comprising:

a printer, a peripheral device;

an interface, which connects the printer and the peripheral device;

a storage, provided in the printer to store hardware specification data;

a recording medium, provided in the peripheral device to store at least one first setting information item;

a first transmitter, provided in the printer to transmit the hardware specification data to the peripheral device via the interface;

a display, provided in the peripheral device to display the first setting information item which matches with the hardware specification data as at least one second setting information item;

a selector, provided in the peripheral device to select one of the at least one second setting information item as a print condition, upon receipt of an instruction from a user;

a data generator, provided in the peripheral device to generate print job data including the print condition;

a second transmitter, provided in the peripheral device to transmit the print job data to the printer via the interface; and a receiver, provided in the printer to receive the print job data to perform printing.

According to the present invention, there is also provided a peripheral device connected to a printer via an interface, comprising:

a recording medium, which stores at least one first setting information item;

a receiver, which receives hardware specification data of the printer which is transmitted from the printer via the interface;

a display, which displays the firsts setting information item which matches with the hardware specification data as at least one second setting information item;

a selector, which selects one of the at least one second setting information item as a print condition, upon receipt of an instruction from a user, a data generator, which generates print job data including the print condition; and a transmitter, which transmits the print job data to the printer via the interface.

In this configuration, since only the print-condition setting information is indicated, a desired print-condition file can readily be selected from the memory card stored with a plurality of print-condition files, in the interface of the peripheral device such as a digital camera connected to the printer.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a diagram illustrating a data structure in a memory card shown in FIG. 1;

FIG. 4 is a diagram illustrating an example of contents of a print-condition setting script stored in the memory card;

DETAILED DESCRIPTION OF THE PREFERRED EMBODIMENTS

Preferred embodiments of the invention will now be described by reference to the accompanying drawings. However, the invention is not limited to these embodiments but intended to describe the invention by way of example. Moreover, the invention can be implemented in various modes without departing from the substance thereof.

Figure 1:
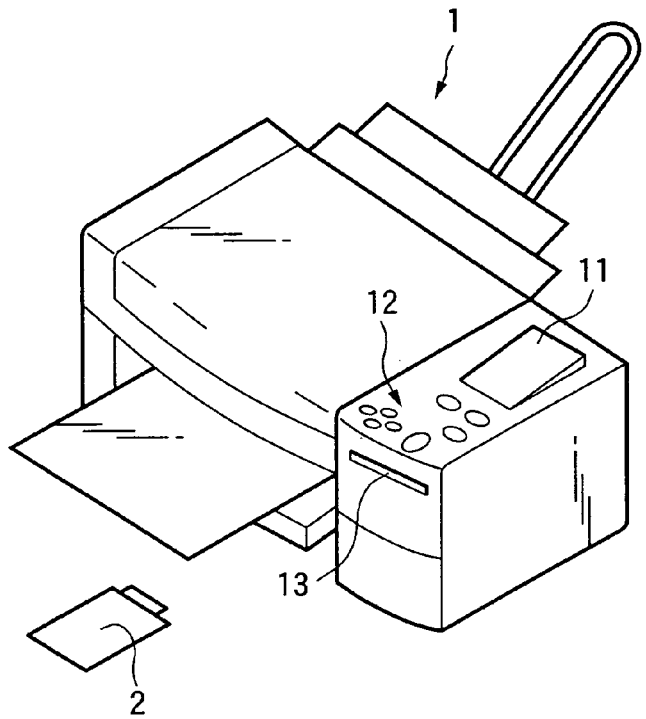
FIG. 1 is a diagram showing the external appearance of a printer according to a first embodiment of the invention.

As shown in FIG. 1, a liquid crystal panel 11 and a plurality of buttons 12 are provided on the top face of a body of a printer 1 to form a user interface. In other words, a predetermined guidance message and so forth are displayed on the liquid crystal panel 11, so that a user is allowed to supply to the printer 1 print conditions and print instructions to be set interactively by pushing the buttons 12 in a manner corresponding to the contents displayed. Further a card slot 13 as an external interface is provided in the front body of the printer 1. The card slot 13 is in conformity with the PCMCIA standard and so arranged as to make replaceable a memory card 2 conforming to the standard.

Such a printer 1 is known as a stand-alone printer that need not be connected to a host computer. More specifically, the printer 1 displays a message on the liquid crystal panel 11 and awaits print instructions, the message urging the user to provide instructions about carrying out printing when the printer 1 detects the attachment of, for example, the memory card 2 into the card slot 13. Incidentally, the user is able to set the print conditions and provide the print instructions by pushing the buttons as occasion demands. Upon acceptance of the user's print instructions, the printer 1 reads image data stored in the memory card 2 and prints the data on printing paper. Thus, the user is able to utilize the printer 1 in such a manner as to directly print pictorial data deriving from a digital camera without the aid of the host computer.

However, such a stand-alone printer may be provided with any one of the interfaces including a parallel interface, a USB interface, a network interface or the like.

The memory card 2 incorporates a nonvolatile rewritable memory and is attached or detached with respect to the printer 1 and a digital camera. The user takes image data in the memory card 2 by taking photographs with the digital camera with the memory card 2 installed therein, and then takes out the memory card 2 from the digital camera and attaches the memory card 2 to the printer 1 for printing purposes. The image data thus taken in is stored in the memory card 2 in the form of files. Further, scripts for setting predetermined print conditions to the printer 1 (hereinafter, referred as "print-condition setting scripts") have been stored in the memory card 2 beforehand.

In a case where the memory card 2 attached to the digital camera is a Compact Flash™ memory, for example, the memory is to be fitted into the card slot 13 of the printer 1 based on the PCMCIA standard via a PC card adaptor, however, this arrangement means to include the use of such a PC card adaptor in a broad meaning.

Figure 2:
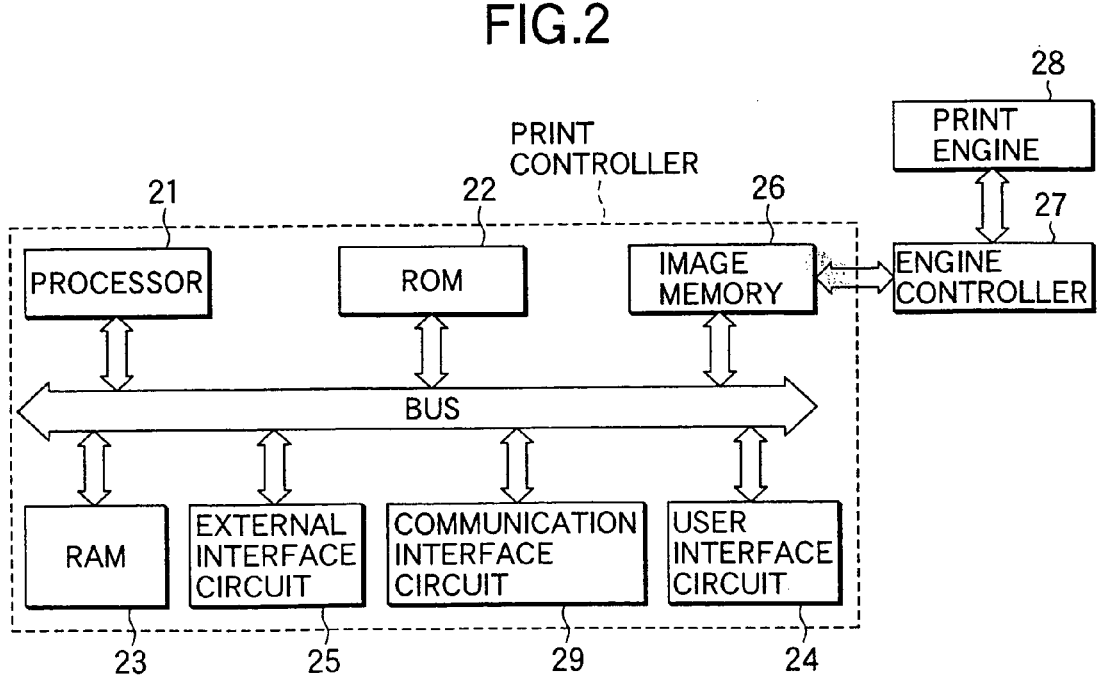
FIG. 2 is a block diagram of a hardware configuration of the printer shown in FIG. 1.

As shown in FIG. 2, a processor 21 executes various control programs stored in a ROM 22 while using a RAM 23 serving as a main storage and also performs integral control over the printer 1. In other words, the processor 21 allows the programs to be executed so that the printer 1 can performs the predetermined functions in cooperation with the hardware. According to this embodiment, the printer 1 implements at least the following functions including user interface, print-condition setting, script interpreting/executing, image generating and print-control. Further, the ROM 22 stores specification information that it supports, for example, monochromatic/color printing, paper sizes and so forth.

A user interface circuit 24 is a circuit for controlling the user interface attained via the liquid crystal panel 11 and the various buttons 12. An external interface circuit 25 allows the processor 21 to access the memory card 2 put into the card slot 13. When the memory card 2 is put into the card slot 13, the external interface circuit 25 requests the processor 21 for an interruption. On detecting the interruption, the processor 21 awaits an input of print-condition setting from the user. With the print-condition setting, the user is able to select print conditions prepared on the printer side via the user interface and also to select a desired print-condition setting file out of a plurality of print-condition setting files stored in the memory card 2. After the print-condition setting file is selected by the user via the user interface circuit 24, the processor 21 accepts the print instructions, interprets the selected print conditions (including the selection of print-condition setting script) and generates image data based on the pictorial data.

An image memory 26 is a memory for temporarily storing the image data thus generated. An engine controller 27 reads the image data stored in the image memory 26 while controlling the operation of a print engine 28 and supplies the image data to the print engine 28. The engine controller 27 is activated by the print command sent from the processor 21 as a trigger when print image data for a predetermined printing width is obtained in the image memory 26. The print engine 28 is constituted of, for example, a paper feed mechanism and a print head to perform printing on a printing medium such as paper. In this case, a specific kind of printer such as a laser or serial printer may be employed, if necessary, as the print engine 28.

A communication interface circuit 29 is for use in communicating with the host computer represented by a personal computer and various interfaces such as a parallel interface, a USB interface and a network interface is applicable thereto. Moreover, the communication interface circuit 29 is not limited to a personal computer but preferably able to communicate with any other peripheral equipment such as a digital camera provided with the data to be printed. There is a USB communication interface as such a communication interface.

As shown in FIG. 3, the memory card 2 stores an image data file and the print-condition setting file. Each file may be managed hierarchically. Print-condition setting script is typically and separately prepared/edited by the personal computer and stored in the memory card 2. Preferably, a plurality of print-condition setting scripts defining various print conditions are stored; however, there may be cases where only one print-condition setting script is stored and where no print-condition setting script is stored.

In FIG. 4, line numbers are added for the sake of convenience. As shown in this figure, the exemplary print-condition setting script essentially consists of header sections (lines 1 to 14) and page sections (lines 15 to 16). A command for designating a paper size of "3.5×5 inches" (so-called L size) is described on the 13th line of the header section.

Figure 5:
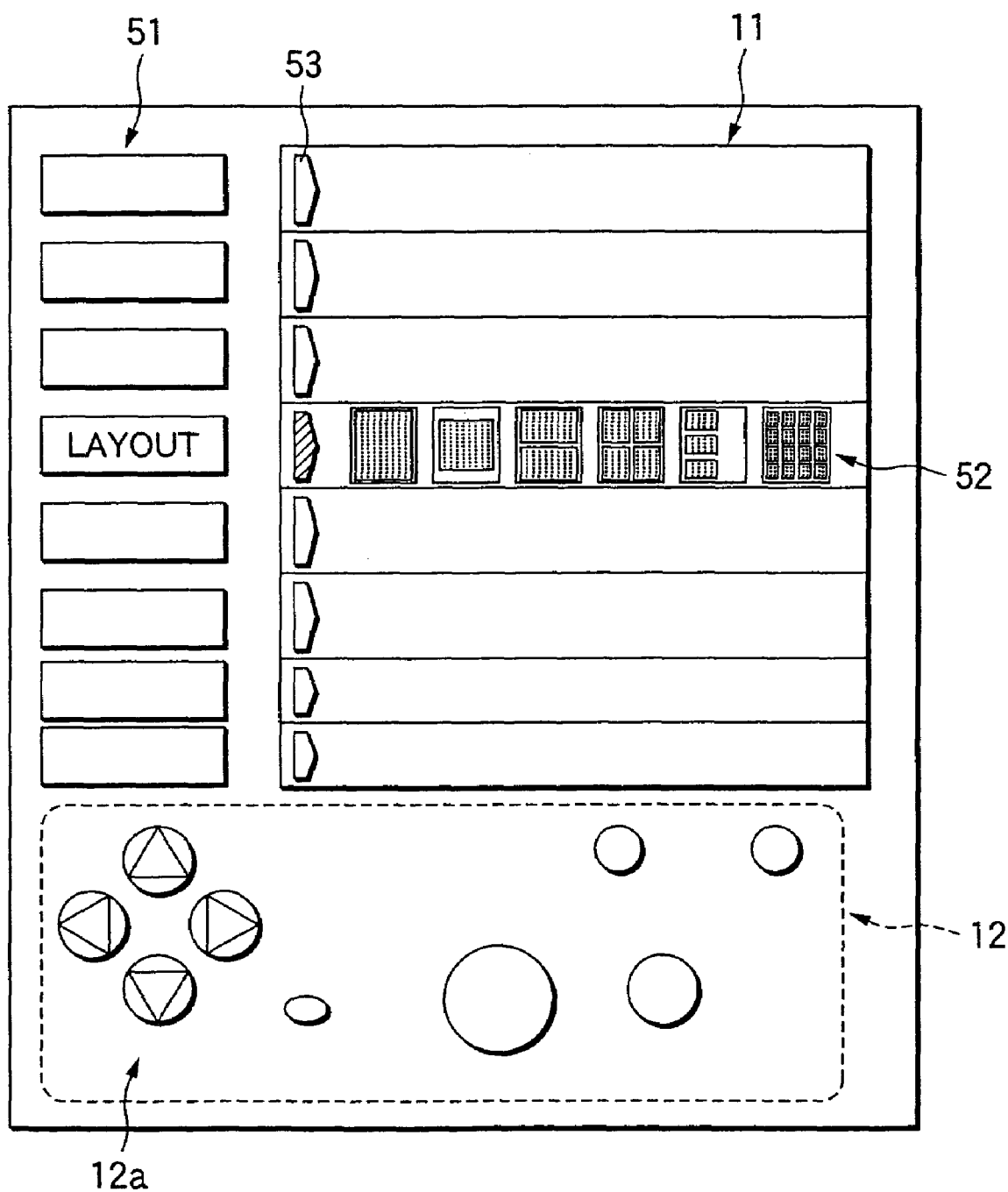
FIG. 5 is a diagram illustrating an example of a user interface of the printer.

As shown in FIG. 5, the user interface essentially consists of the liquid crystal panel 11 and the various buttons 12. The liquid crystal panel 11 provides sub-items 52 in each item 51, including 'print method,' 'kind of paper,' 'paper size' and so forth. Although all sub-times 52 are shown in this figure, only the selected sub-items 52 are displayed during the operation. Various print conditions can be set to the printer 1 among the sub-items 52. In this case, though six kinds of sub-items are prepared for a 'layout' item beforehand, which are called 'standard layouts,' those which can be provided and utilized by the print-condition setting script are called 'extended layouts.'

The item 51 subjected to the selection is indicated by a cursor pointer 53 (hatched one), the item 51 and the sub-item 52 being selected by pushing one of the left, right, up and down cursor buttons 12$a$. More specifically, the display of the cursor pointer 53 is moved in the corresponding direction when the user pushes the up or down cursor button, so that the user is informed of the item 51 subjected to the selection. While one of the items 51 is selected, the display of the sub-item 52 is moved in the corresponding direction when the user pushes the left or right cursor button, so that the user is informed of the sub-item 52 subjected to the selection. Through the above operation performed by the user, the values of print-condition parameters in conformity with the sub-items thus selected are set and reflected on the actual print conditions.

Figure 6:
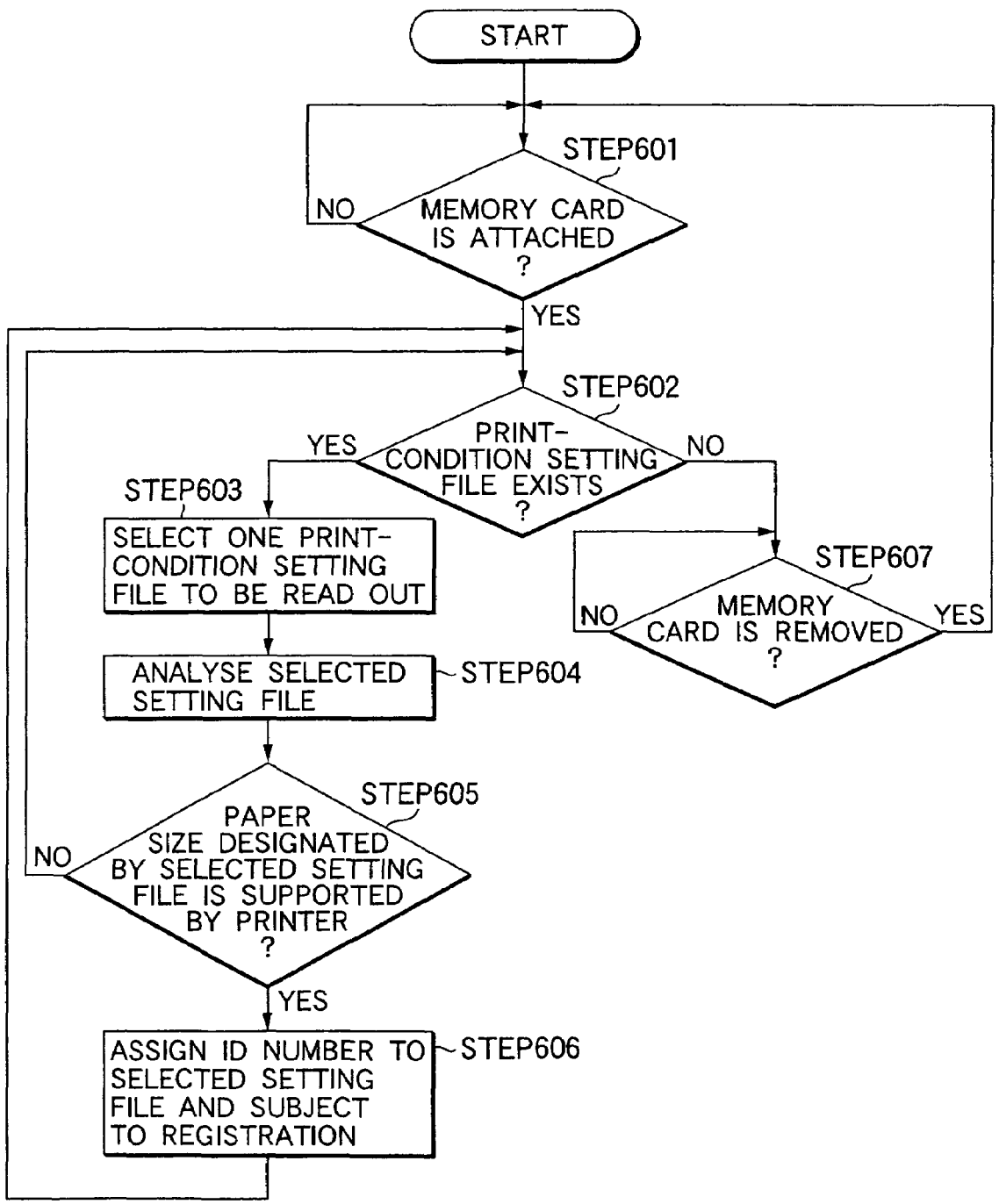
FIG. 6 is a flowchart explanatory of processing performed when the memory card is attached to the printer.

When the memory card is attached to the printer 1, the processing shown in FIG. 6 is performed by a memory card management program (module) and executed by the printer 1 in operation.

Figure 7:
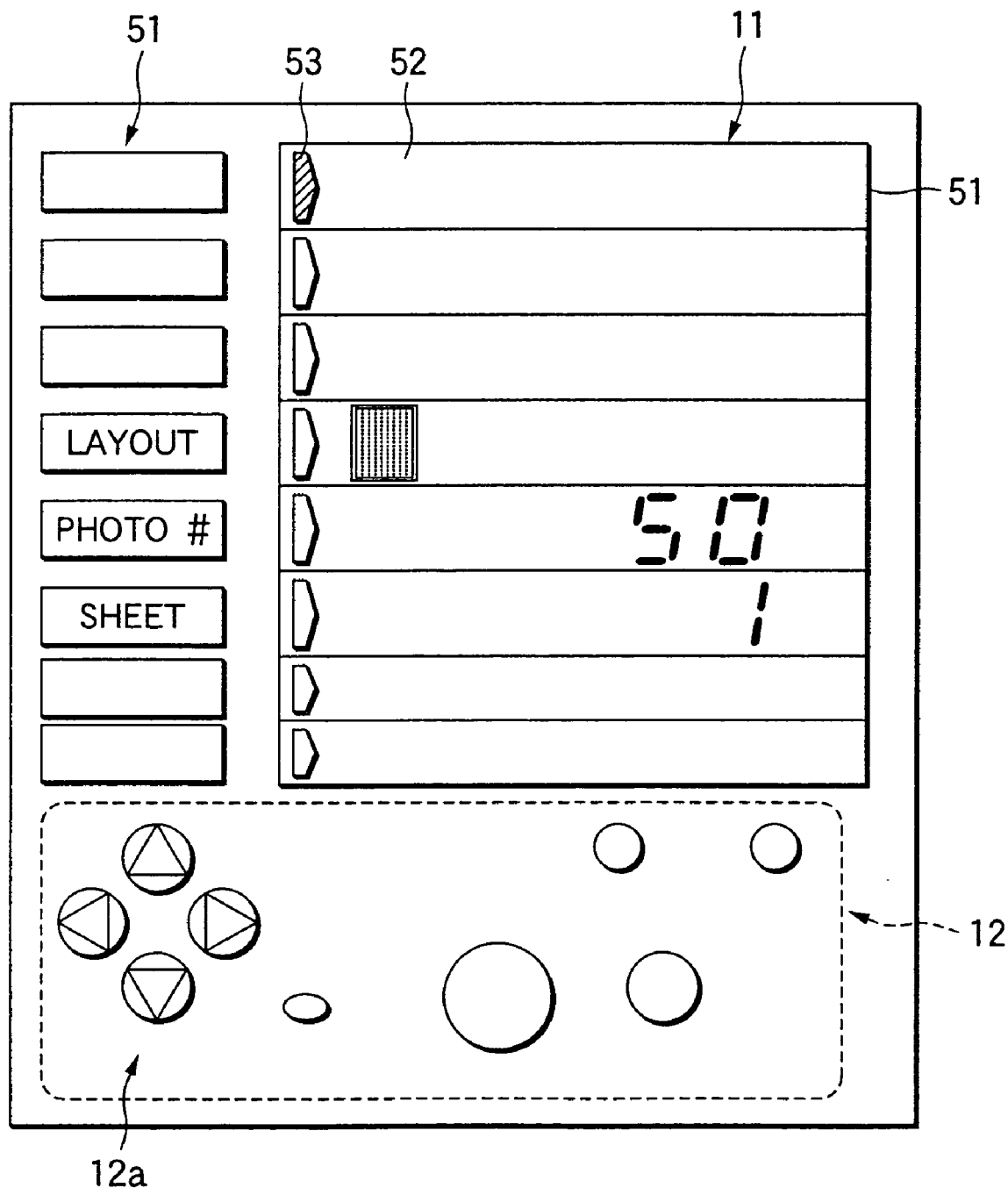
FIG. 7 is a diagram illustrating an example of the user interface.

As shown in FIG. 6, the memory card management program is executed to monitor any interruption from the external interface circuit 25 (STEP 601). The interruption occurs when the memory card is attached to the card slot 13. On detecting the interruption, the memory card management program gains access to the memory card 2 and checks whether the print-condition setting file exists therein (STEP 602). Then the memory card management program checks the number of image data files stored in the memory card 2 and controls the external interface circuit 25 so that the set value of the present print-condition parameter is displayed on the liquid crystal panel 11. FIG. 7 shows an example of the user interface immediately after the memory card 2 is attached to the card slot 13. In the 'layout' item, 'the whole page printing' prepared as the standard layout has been selected in this example.

In a case where print-condition setting files are stored in the memory card 2, the memory card management program selects and reads one print-condition setting file via the external interface circuit 25 (STEP 603). The memory card management program subsequently analyzes the script representing the contents of the print-condition setting file (STEP 604) and checks whether the paper size designated by the setting file is the paper size that is supported by the printer (STEP 605) More specifically, the memory card management program refers to the value of "HdPhysicalPaperSize" described in the header section of the print-condition setting script. When the memory card management program decides that the script is consequently a supported script, the memory card management program registers the print-condition setting script in a predetermined area of the RAM 23 (STEP 606). In a case where the script designates "A3" size and where the printer does not support printing using the paper, for example, the script is not registered. When the script is registered, the memory card management program assigns an identification number to the print-condition setting script. The identification number is used to make the user identify the number over the user interface. The memory card management program performs the processing above with respect to all the print-condition setting files stored in the memory card 2 (STEPs 602-606). When the memory card management program finishes performing the processing above, the memory card management program remains to stand by until the memory card 2 is removed (STEP 607). When the memory card 2 is removed, the memory card management program returns to STEP 601 and monitors the entry of the memory card 2.

Figure 8:
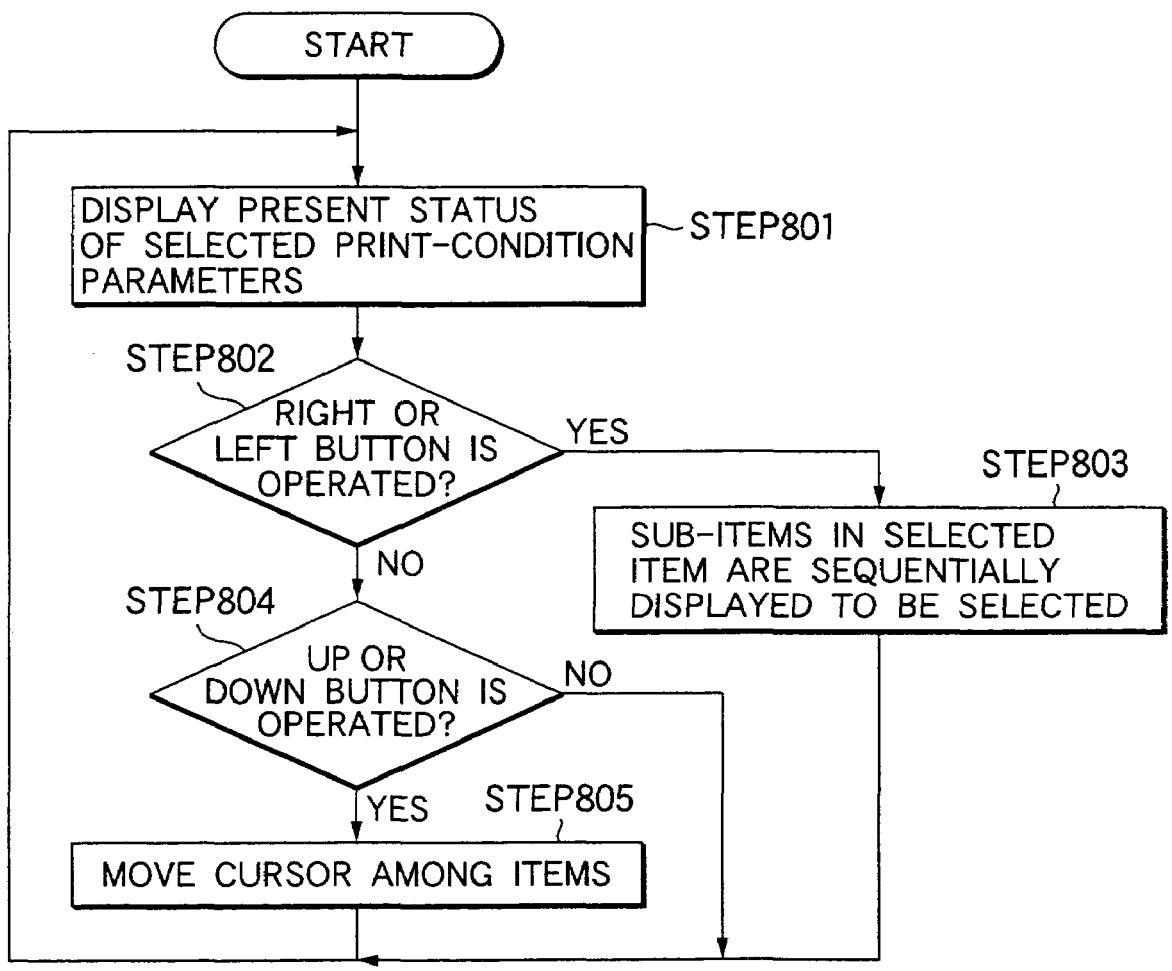
FIG. 8 is a flowchart explanatory of the display/selection processing performed in the user interface.

When the display/selection processing is performed in the user interface, processing shown in FIG. 8 is performed by, for example, a user interface program (module), and the printer 1 in operation executes this program.

As described above, the user interface program displays the contents of the present status of the selected print-condition parameter when the memory card 2 is attached to the card slot 13 (STEP 801; e.g., FIG. 7). The user is allowed to set print conditions by pushing the up, down, left and right cursor buttons 12a in this condition. When the user operates the left or right cursor button (Yes at STEP 802), the user interface program changes the display of the sub-item 52 in the item 51 sequentially (STEP 803). When a layout is selected, the processing of selecting the standard layout or an extended layout is performed as will be described later.

When user operates the up or down cursor button (Yes of STEP 804), on the other hand, the user interface program moves the cursor 53 among the items 51 (STEP 805).

Figure 9:
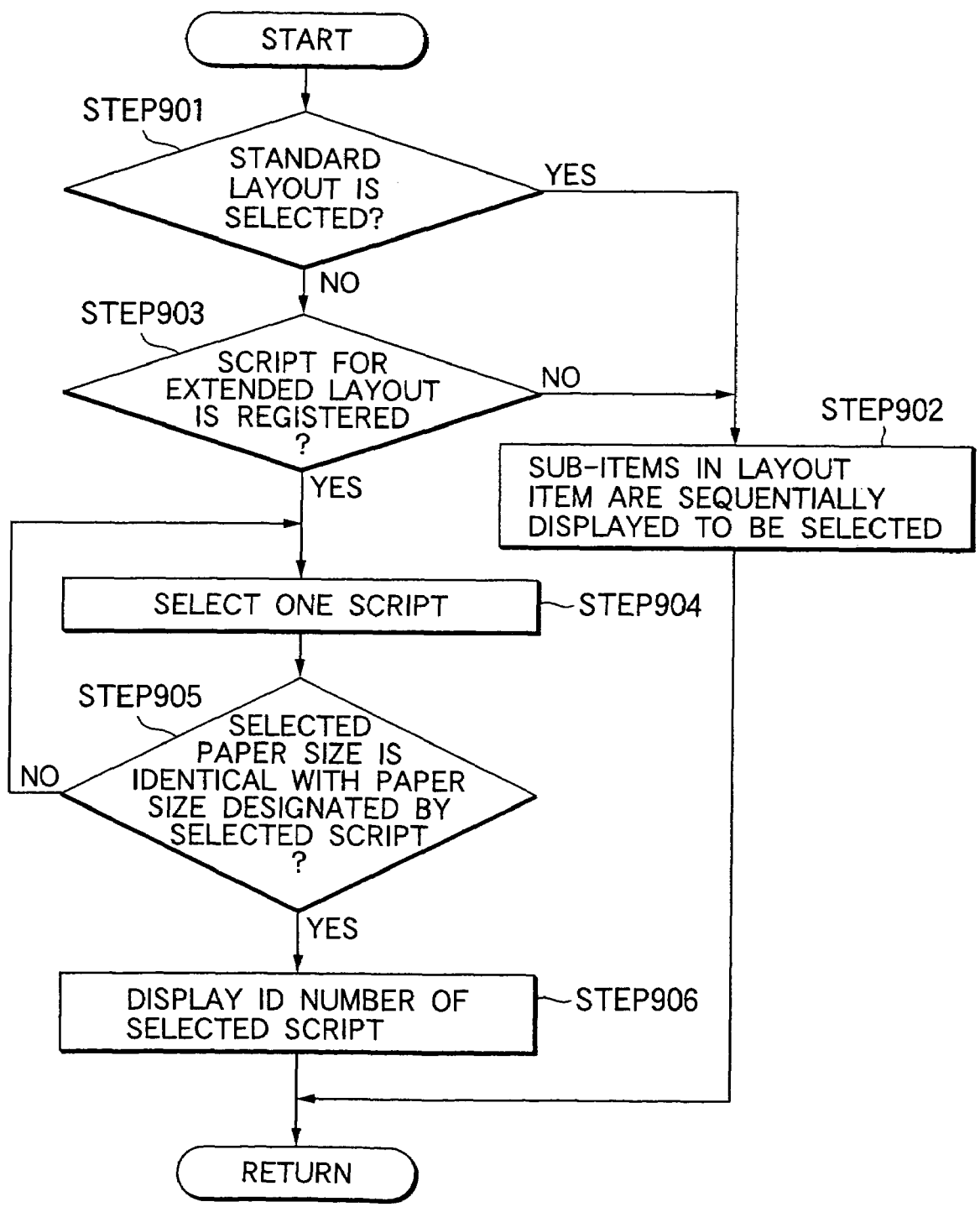
FIG. 9 is a flowchart explanatory of processing when a layout selection is performed.

When the user pushes the left or right cursor button at the time the 'layout' item is selected, the processing shown in FIG. 9 is performed. The user interface program checks whether the user's operation is intended to set the standard layout or an extended layout (STEP 901). When the setting of the standard layout is requested, the user interface program causes the highlighted display to move to the sub-items 52 of the layout item, so that one parameter is to be selected (STEP 902).

When the setting of the standard layout is not requested, that is, when any sub-item other than the sub-items 52 at both ends is selected, on the other hand, the user interface program checks whether any script has been registered in a predetermined area in the RAM 23 (STEP 903). When the user interface program decides that no script has been registered, STEP 902 is followed because only the standard layout can be displayed/selected. In this case, the sub-item 52 on the opposite side is displayed such that it looks as if it returns to the first place. When the user interface program decides that there exists a script, on the other hand, the user interface program performs the following processing including displaying/selecting the extended layout.

In other words, the user interface program selects one registered script (STEP 904). Then the user interface program compares the paper size designated by the selected script with the paper size selected over the user interface and checks whether both the paper sizes conform to each other (STEP 905).

In a case where both the paper sizes do not conform to each other, the user interface program returns to STEP 904 and selects the next one script and does checking likewise. As only the paper size that the user interface program supports previously has been registered, the user interface program is able to finally select the conformed script by checking the paper sizes sequentially. When the paper size is decided to be in conformity with what is intended at STEP 904, the identification number attached to the script is displayed on the user interface (STEP 906). In a case where A4 size is selected over the user interface, for example, only a script designating a layout for A4 size out of those stored in the memory card 2 are sequentially displayed.

Figure 10:
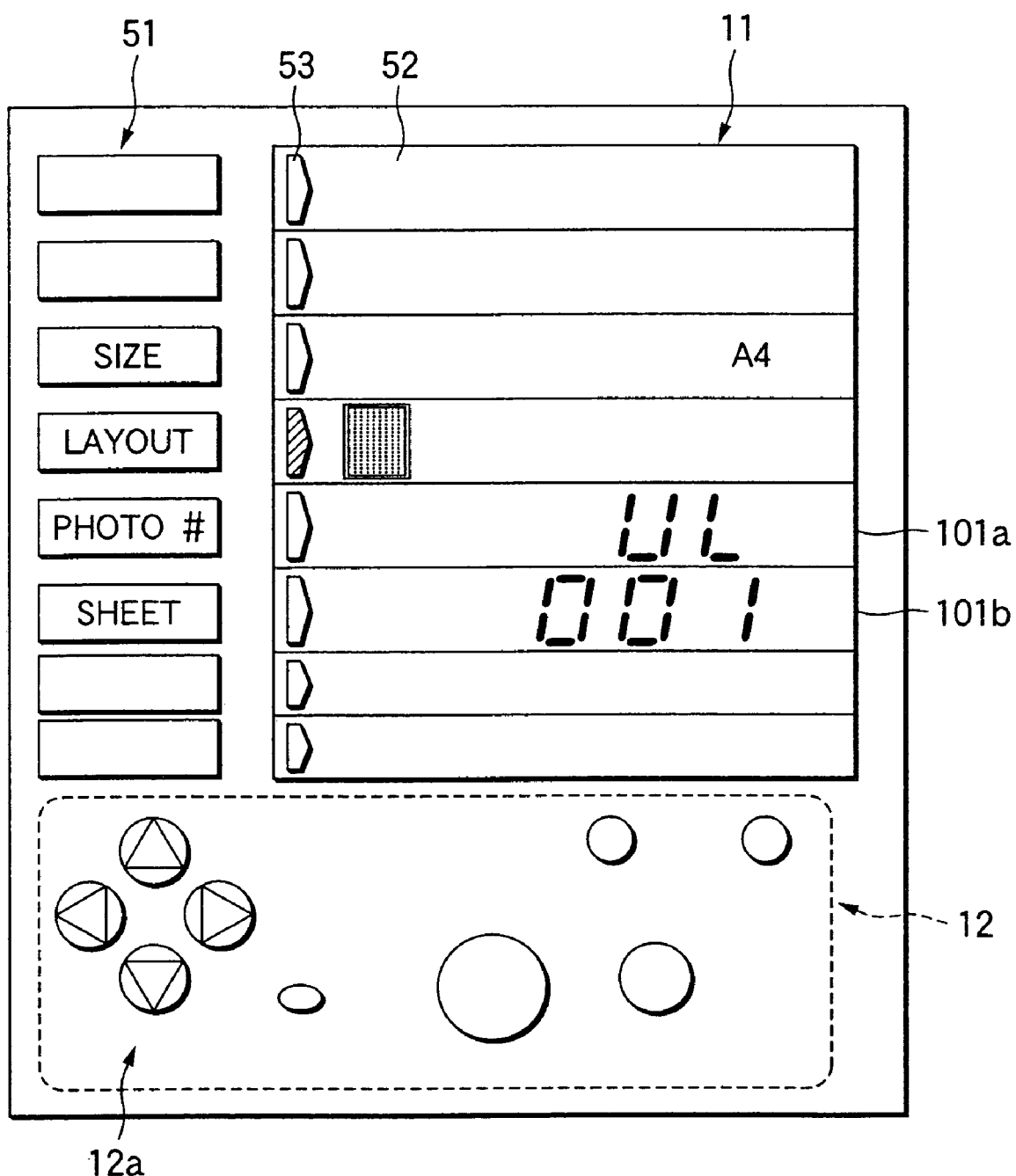
FIG. 10 is a diagram illustrating an example of the user interface.

FIG. 10 shows an example of the user interface at this time. As shown in this figure, the display areas of 'photo #' (used for photo selection) and 'sheet' (used for designating printed number of sheet) of the items 51 are utilized respectively as display areas 101a and 101b for extended layouts. In other words, the diagram indicates a state in which "UL" as an extended layout display and a script with an assigned identification number "001" have been selected. When the user pushes the left (or right) cursor button in this state, the user interface program selects the script and displays its identification number at the same time.

In a case where the user pushes the up (or down) cursor button to move the cursor pointer 53 to 'paper size' of the item 51 first and selects an extended layout in 'layout' of the item 51 again after pushing the left (or right) button so as to select 'post card' of the sub-item 52, the user interface program performs the processing shown in FIG. 9 similarly. Then a script designating a layout for postcard size is displayed and the script for a postcard is displayed each time the left (or right) cursor button is pushed.

Figure 11:
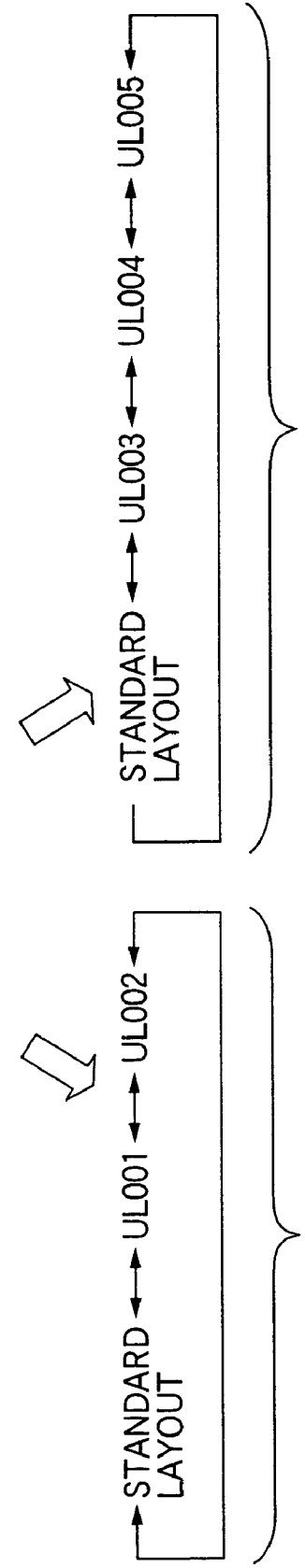
FIGS. 11A to 11D are diagrams explanatory of the operation of the printer.

The operation of the printer 1 according to this embodiment of the invention will now be described by with reference to FIGS. 11A to 11D. As shown in FIG. 11A, there are nine print-condition setting files (scripts) to be stored in the memory card 2: namely, "B4TATE.USD" and "B4YOKO.USD" as scripts for defining layouts for B4 size; "B5TATE.USD" and "B5YOKO.USD" as scripts for defining layouts for B5 size; and "NENGA.USD," "HIKKOSHI.USD" and "KEKKON.USD" as scripts for defining layouts for postcard size. In this case, the printer 1 is considered to support sizes of 'roll paper,' 'A4' and 'postcard.'

When the user fits the memory card 2 into the card slot 13, the printer 1 reads in and interprets these print-condition setting files. Further, the printer 1 assigns identification numbers to the respective scripts for paper sizes that the printer 1 supports for the purpose of registration as shown in FIG. 11B. When the user selects not only the A4 paper size over the user interface but also the corresponding layout in this state, for example, switching of displays is made as shown in FIG. 11C, whereas when the user selects not only the postcard size but also the corresponding layout switching of displays is made as shown in FIG. 11D.

The processing order may be changed in order or otherwise may be arranged in parallel order unless any inconsistency occurs in the operation.

According to this embodiment, paper sizes designated by print-condition setting files stored in a memory card is first checked, so that only scripts designating paper sizes supported by a printer is read out; and only scripts associated with paper sizes selected on a user interface are subsequently displayed as alternatives. Therefore, the user can easily select a desired script.

Further, as print-condition files designating extended layouts are stored in a memory card beforehand whereby to allow a printer to set print conditions accordingly, so that it is possible to provide a printer which is full of expandability and flexibility in view of setting print conditions.

Still further, extended layouts can be displayed/selected sequentially in the user interface provided with only necessary and sufficient functions to make the printer achieve the original display/selection objective of setting various print conditions.

In this embodiment, only script included in a print-condition setting file which designates a paper size supported by a printer is read out and registered. However, even though a paper size designated by a print-condition setting file is not exactly the same as a paper size supported by a printer, a script included in the print-condition setting file may be read out and registered if aspect ratios of these paper sizes are not so different.

Namely, when a printer supports a paper size of A4 size (JIS definition), a script included in a print-condition setting file which designates a paper size other than the A4 size may be read out if the paper size designated by the print-condition setting file is included in A-series or B-series in the JIS definition whose aspect rate is not so different from an aspect rate of A4 size.

Figure 12:
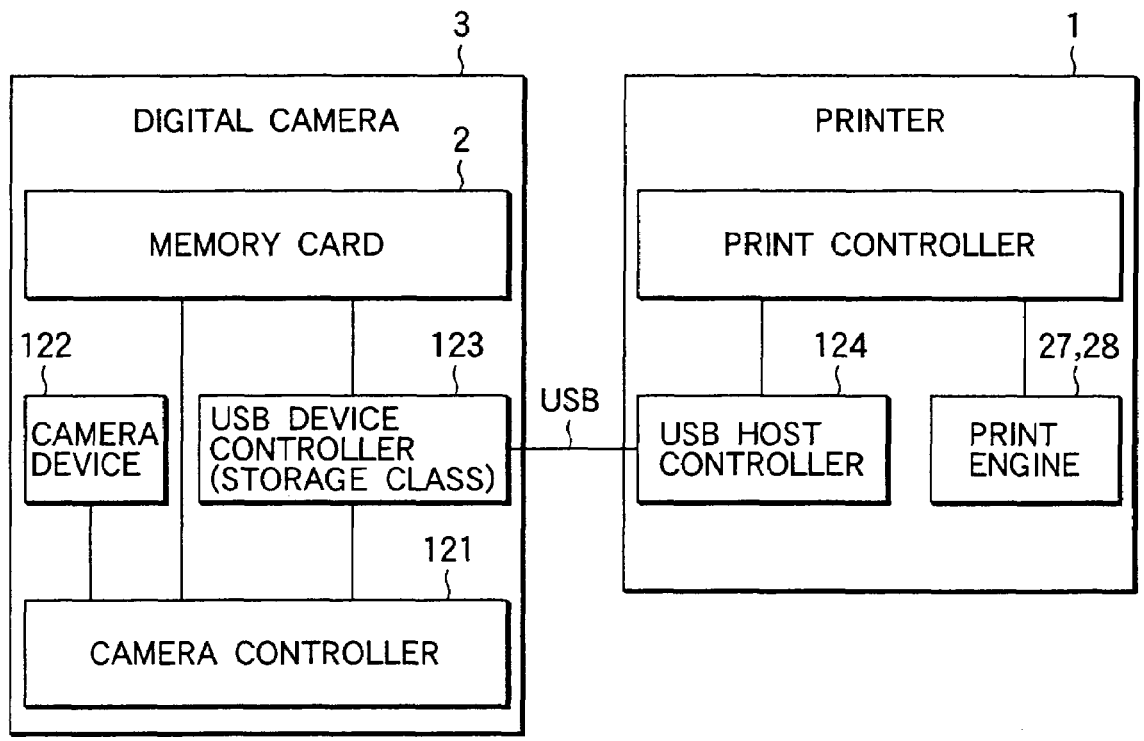
FIG. 12 is a block diagram explanatory of the overall arrangement of a printer system according to a second embodiment of the invention.

FIG. 12 shows a printer system according to a second embodiment of the invention a printer 1 and a digital camera 3 are connected via a USB communication interface cable to form the print system. Of the printer and the digital camera connected together via the USB communication interface, for example, the printer is defined as a 'USB host' or a master in communication processing, whereas the digital camera is defined as a 'USB device' or a slave therein.

Therefore, the digital camera 3 is not allowed to send commands to the printer 1 independently. Consequently, the printer 1 periodically issues and transmits an inquiry command to the digital camera 3, whereas the digital camera 3 transmits a reply command to the printer 1 whereby to make a desired request As shown in FIG. 12, the digital camera 3 comprises a camera controller 121 for totally controlling its own operation, a camera device 122 for taking photographs via a finder (not shown) to obtain image data, a memory card 2 for storing the image data obtained by the camera device 122, and a USB device controller 123 for communicating with the printer 1 serves as the USB host.

Figure 13:
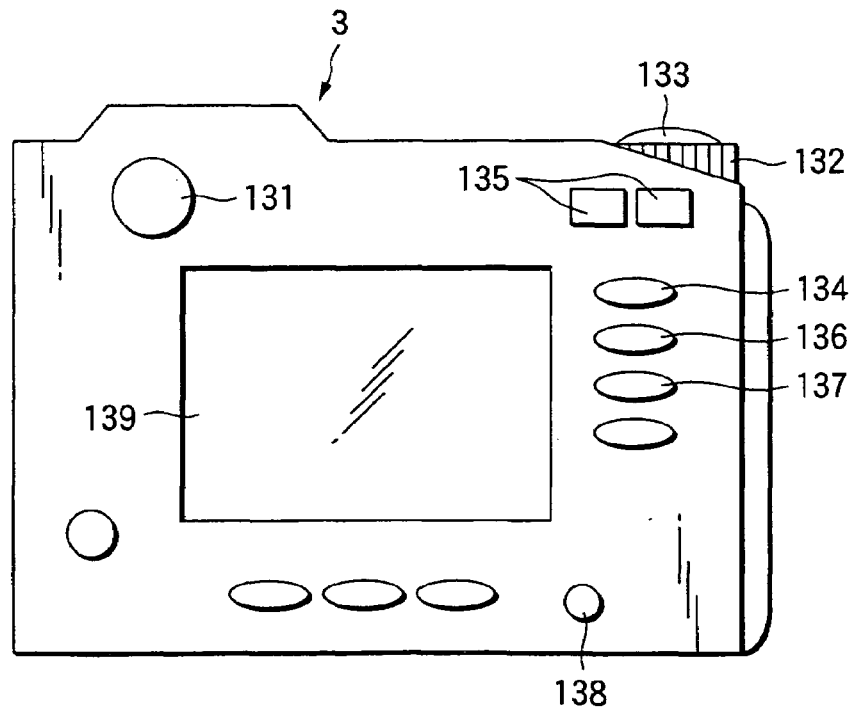
FIG. 13 is a diagram illustrating a user interface of a digital camera.

The camera controller 121 controls a user interface having various control buttons and a color liquid crystal panel, as shown in FIG. 13. The user interface of the digital camera 3 includes a power supply button 131 for switching on/off of a power supply, a dial switch 132 for setting modes such as photographing, replaying and direct print modes, a shutter button 133 for inputting a shutter command, a scene setting button 134 for setting the scene in the photographing mode, a zoom button 135 for setting zoom magnifications, a next selection key 136, a previous selection key 137, an enter key 138 and a color liquid crystal panel 139 for displaying image data on the photograph taken.

The camera controller 121 drives the camera unit 122 in response to the shutter operation, performs photographic processing, stores image data thus obtained to the memory card 2, and reads out the image data from the memory card 2 in response to a predetermined image-reference operation so as to control the display of the image data on the color liquid crystal panel 139. Further, the camera controller 121 displays a print-condition setting screen on the color liquid crystal panel 139 in response to the print setting operation so as to control over the provision of interactive operating environment.

The USB device controller 123 serves as a storage class device which communicates with a USB host controller 124 in conformity to the USB standard. Consequently, the printer 1 as the USB host gains access to the memory card 2 as the device in the USB storage class and is allowed to read and write the image data (e.g., JPEG file) stored therein.

The processing of setting print conditions in this embodiment will be described with reference to FIG. 14.

Figure 14:
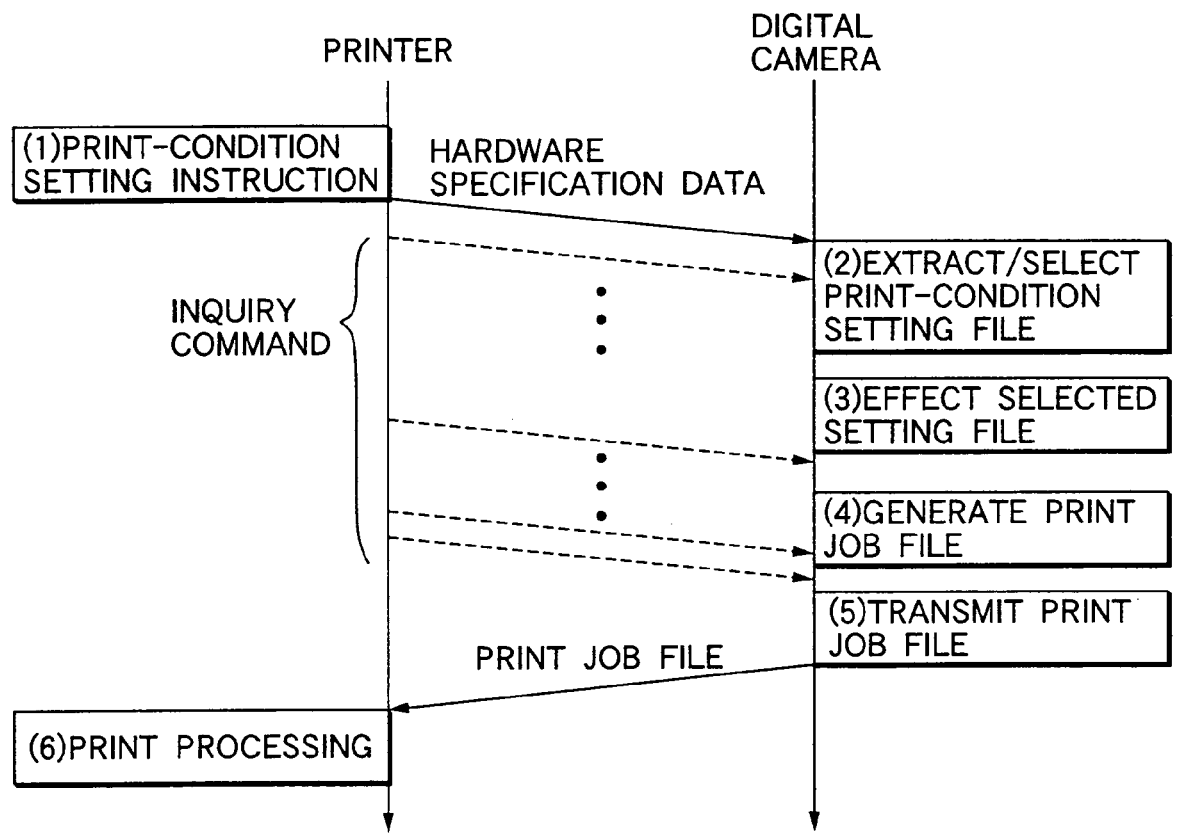
FIG. 14 is a sequence diagram explanatory of the processing of setting print conditions in the print system shown in FIG. 12.

The user give print-setting instructions to the printer 1 by operating the user interface of the digital camera 3 ((1) in FIG. 14). Upon receipt of the instructions, the printer 1 reads its own hardware specification data stored in the ROM 22 and sends the data as print-setting requests to the digital camera 3 via the USB communication interface.

Figure 15:
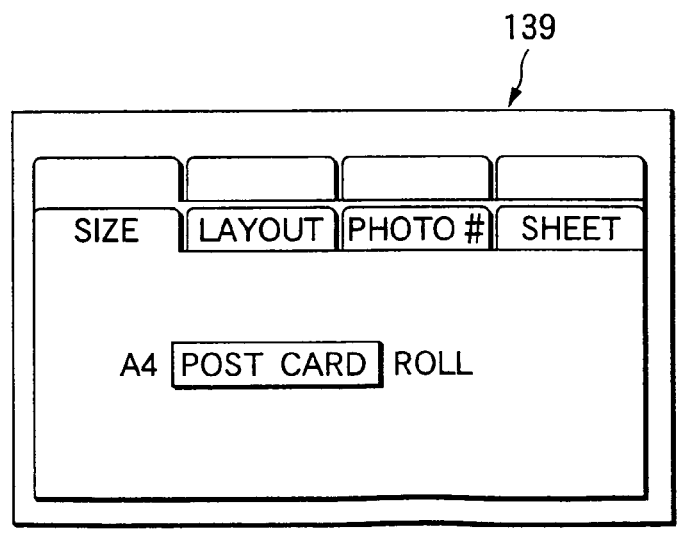
FIG. 15 is a diagram illustrating an example of a print-setting screen in the digital camera.

On receiving the print-setting request from the printer 1, the digital camera 3 reads and interprets the print-condition setting files stored in the memory card 2 sequentially, extracts print-condition setting files conforming to the hardware specification of the printer 1 and provides the color liquid crystal panel 139 with the contents of each file as shown in FIG. 15. On receiving the contents of the files, the user pushes various operating buttons provided on the back of the digital camera 3 so as to select a desired print-condition setting file ((2) of FIG. 14). When the user selects the desired print-condition setting file and operates the enter key 138, the selected print-condition setting file is effected ((3) of FIG. 14). The operation of the decision key 138 in this case is equivalent to an instruction concerning the execution of printing under the print conditions shown by the settled print-condition setting file.

When the decision key 138 is operated with the print-condition setting file thus settled, the digital camera 3 generates a print job file (print job data) and stores the file to the digital camera 3 ((4) in FIG. 14). The print job file is a file in which the contents of the print job are described in a predetermined format, for example, in a text mode. In the print job file, information indicative of relevancy to an image file in the form of JPEG corresponding to image data as printing objects and print conditions (e.g., the kind of paper, paper size, the number of printing copies, an image correcting method and so forth) together with information concerning relevancy to a layout defining file defining the page layout should preferably be described at least.

When the instruction concerning the execution of printing is given to printer 1 from the digital camera 3, the printer 1 reads the print job file independently from the memory card 2 attached to the digital camera 3 as the device in the USB storage class ((5) in FIG. 14).

The printer 1 is provided with an image processing section and a color conversion/binarizing section and on receiving the print job file from the digital camera 3, the printer 1 interprets the file reads the JPEG image file that is the image data as a printing object by path information indicating the place of the image data as the printing object from the memory card 2 of the digital camera 3. The printer 1 processes the JPEG image file thus read in into 8-bit RGB data per color in the image processing section and converts the data to image data for printing in the color conversion/binarizing section. Then the printer 1 does printing while controlling the print engine according to the image data ((6) in FIG. 14).

According to this embodiment, the user interface of a peripheral device such as the digital camera 3 connected to the printer 1 via a communication interface such as a USB is employed so that the print-condition setting file of the printer 1 can be selected. In this case, the printer 1 gains access to a memory card 2 attached to the digital camera 3 instead of a memory card 2 to be attached to a card slot 13 and operates to perform the printing operation directly by selecting the print-condition setting file stored in the memory card of the digital camera 3.

Thus, the user interface of the digital camera 3 can be utilized for selecting the desired print-condition setting file stored in the memory card 2 even if the user interface of the printer 1 is provided with only necessary and sufficient functions to make the printer achieve the original display/selection objective of setting various print conditions.

Further, printing can be done directly without the aid of a personal computer by generating the print job file in accordance with the print-condition setting file selected in the digital camera 3 and sending the file to the printer 1. Particularly, since the digital camera 3 transmits a reply to the printer 1 in response to an inquiry command from the printer 1, direct printing is achievable even in a case where the digital camera 3 is defined as a slave device of the printer 1 at the time communication processing is performed.

Incidentally, this embodiment of the invention can be modified as follows: the image processing section and the color conversion/binarizing section may be provided in the digital camera 3 instead of the printer 1. Further, the digital camera 3 need not be necessarily defined as a USB device. The digital camera 3 may be so arranged as to issue commands independently.

Further, though the digital camera 3 is employed as an example of peripheral equipment, mobile telephones, portable remote terminals and so on are also applicable. The JPEG has been cited as an example of the data format of the image file but any other data format in the form of PNG may also employed.

In addition, though the digital camera 3 is made to send data to the printer in the form of print job files, it may be so arranged as to send print job data in the form of commands, for example.

What is claimed is:

1. A digital camera which is connectable to a printer, comprising:
   a shutter release button;
   a controller, which captures an image based on an operation of the shutter release button;
   a storage, configured to store the image;
   a reader, which reads out the image from the storage;
   a receiver, which receives specification information supported by the printer;
   a setter, which sets a print parameter in accordance with the specification information;
   a transmitter, which transmits the set print parameter to the printer for causing the printer to perform a printing of the image in accordance with the transmitted print parameter,
   a display, which displays the print parameter so as to allow a user to select the print parameter in accordance with the specification information; and
   a user interface, which receives an input operation of the user,
   wherein:
   the setter sets the print parameter which is selected through the user interface from the print parameter displayed on the display,
   the print parameter includes a first print condition parameter value and a second print condition parameter value,
   when the first print condition parameter value which is displayed on the display is selected through the user interface, the display displays the second print condition parameter value corresponding to the first print condition parameter value in accordance with the specification information,
   the first print condition parameter value is a parameter value as to a size of print medium;
   the second print condition parameter value is a parameter value as to a layout of the image on the print medium which has the size defined by the first print condition parameter value,
   an identifier of the layout is provided, the identifier being related to a print condition setting information which designates the size of the print medium, and
   wherein even when the first print condition parameter value selected through the user interface is not the same as the size of the print medium designated in the print condition setting information, the display displays the identifier of the layout related to the print condition setting information when an aspect ratio of the selected first print condition parameter value is substantially the same as an aspect ratio of the size of the print medium designated in the print condition setting information.

2. The digital camera as set forth in claim 1, further comprising:
   an information storage, which stores the print condition setting information defining the layout; and
   a register, which reads out the print condition setting information applicable to the size of the print medium supported by the printer in accordance with the specification information.

3. The digital camera as set forth in claim 2, further comprising:
   a generator, which generates print job data having an information as to the image stored in the storage and the layout set to the image as the print parameter, the print job data described by a text format, where the transmitter transmits the print job data to the printer.

4. The digital camera as set forth in claim 1, further comprising:

a generator, which generates print job data having information as to the image stored in the storage as the print parameter, the print job data described by a text format, wherein the transmitter transmits the print job data to the printer.

5. The digital camera as set forth in claim 4, wherein:

the image to be printed is read from the storage by the printer in accordance with the print job data after the printer receives the print job data.

6. The digital camera as set forth in claim 1, wherein:

the printer is connected by a USB interface.

7. The digital camera as set forth in claim 1, further comprising:

a card slot; wherein:

the storage is a memory card inserted in the card slot.

8. A digital camera connected to a printer through a USB interface, comprising:

a shutter release button;

a controller, which captures an image based on an operation of the shutter release button;

a storage, configured to store the image;

a reader, which reads out the image from the storage;

a receiver, which receives specification information supported by the printer;

a setter, which sets a printer parameter in accordance with the specification information;

a generator, which generates print job data having an information as to the image stored in the storage as the print parameter, the print job data described by a text format;

a transmitter, which transmits the print job data to the printer, a display, which displays the print parameter so as to allow a user to select the print parameter in accordance with the specification information; and a user interface, which receives an input operation of the user, wherein:

the image to be printed which is related to the print parameter is read from the storage by the printer in accordance with the print job data after the printer receives the print job data;

the printer serves as a USB host;

the digital camera serves as a USB device;

the setter sets the print parameter which is selected through the user interface from the print parameter displayed on the display;

the print parameter includes a first print condition parameter value and a second print condition parameter value;

when the first print condition parameter value which is displayed on the display is selected through the user interface, the display displays the second print condition parameter value corresponding to the first print condition parameter value in accordance with the specification information;

the first print condition parameter value is a parameter value as to a size of print medium;

the second print condition parameter value is a parameter value as to a layout of the layout of the image on the print medium which has the size defined by the first print condition parameter value;

an identifier of the layout is provided, the identifier being related to a print condition setting information which designates the size of the print medium, and wherein even when the first print condition parameter value selected through the user interface is not the same as the size of the print medium designated in the print condition setting information, the display displays the identifier of the layout related to the print condition setting information when an aspect ratio of the selected first print condition parameter value is substantially the same as an aspect ratio of the size of the print medium designated in the print condition setting information.

* * * * *